(12) United States Patent
Prokhorenkov et al.

(10) Patent No.: US 7,874,761 B2
(45) Date of Patent: Jan. 25, 2011

(54) SUPPORT STRUCTURE FOR A SOFT GROUND

(76) Inventors: Alexey Victorovich Prokhorenkov, ul. 1905 goda, dom 5, kv. 38, 123100, Moscow (RU); Victor Dmitrievich Prokhorenkov, 3-rd Novomikhalkovskiy proezd, dom 13, 125008, Moscow (RU)

( * ) Notice: Subject to any disclaimer, the term of this patent is extended or adjusted under 35 U.S.C. 154(b) by 0 days.

(21) Appl. No.: 12/663,115

(22) PCT Filed: Jun. 9, 2007

(86) PCT No.: PCT/RU2007/000312

§ 371 (c)(1),
(2), (4) Date: Dec. 4, 2009

(87) PCT Pub. No.: WO2008/153432

PCT Pub. Date: Dec. 18, 2008

(65) Prior Publication Data

US 2010/0172694 A1    Jul. 8, 2010

(51) Int. Cl.
    *E01C 5/00*    (2006.01)
(52) U.S. Cl. .............. 404/39; 404/34; 404/35; 404/41
(58) Field of Classification Search .......... 404/34, 404/35, 39, 40, 41, 43; 52/597, 598, 609
See application file for complete search history.

(56) References Cited

U.S. PATENT DOCUMENTS

| 22,035 | A | * | 11/1858 | Savage | 34/237 |
| 110,153 | A | * | 12/1870 | Morse | 404/39 |
| 117,802 | A | * | 8/1871 | Mulford | 404/38 |
| 5,971,655 | A | * | 10/1999 | Shirakawa | 404/40 |
| 6,722,814 | B2 | * | 4/2004 | Byrne | 404/35 |
| 6,769,835 | B2 | * | 8/2004 | Stridsman | 404/41 |

FOREIGN PATENT DOCUMENTS

| DE | 2616041 A1 | 10/1977 |
| EP | 0249376 A2 | 12/1987 |
| RU | 2029815 C1 | 2/1995 |
| RU | 2032790 C1 | 4/1995 |
| RU | 2 107 617 | * 3/1998 |
| RU | 2107768 C1 | 3/1998 |

* cited by examiner

*Primary Examiner*—Gary S Hartmann
(74) *Attorney, Agent, or Firm*—Howard & Howard Attorneys PLLC

(57) ABSTRACT

The inventive support structure for a soft ground consists of at least two elements which comprise a plate [1], on the lower supporting surface of which three anchoring projections in the form of hooks are made or secured, one of these projections [9] being located near the end face [5] and two other [8, 10] being located near side faces [6, 7], and a curved anchoring element [11], the side surfaces [12] of which are inclined with respect to the horizontal surface of the plate and have three arc-like segments [13, 14, 15] projected outside the contour of the plate base.

The invention is characterized in that the side faces [6, 7] of the plate [1] consist of two parts [16, 19] which are inclined in the opposite directions with respect to the longitudinal section, in that the end faces [4, 5] of the plate [1] are inclined in the same direction and in that stops [20, 21] are provided in the area where the differently directed parts of the side faces are conjugated.

The inner surfaces of the anchoring elements [8, 9, 10] can be directed at different angles to the lower surface [3] of the plate [1].

6 Claims, 3 Drawing Sheets

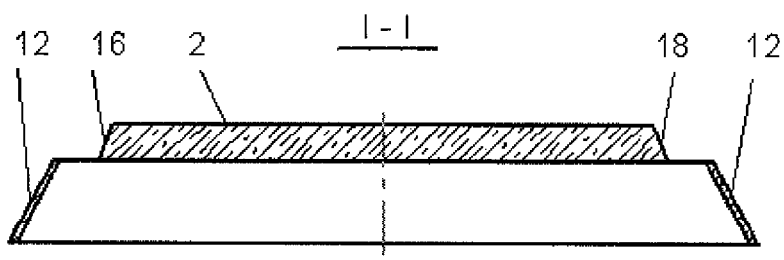
Fig. 3
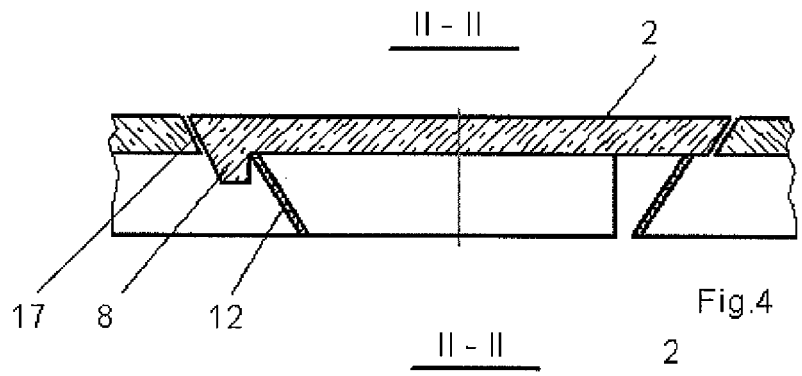
Fig. 4
Fig. 5
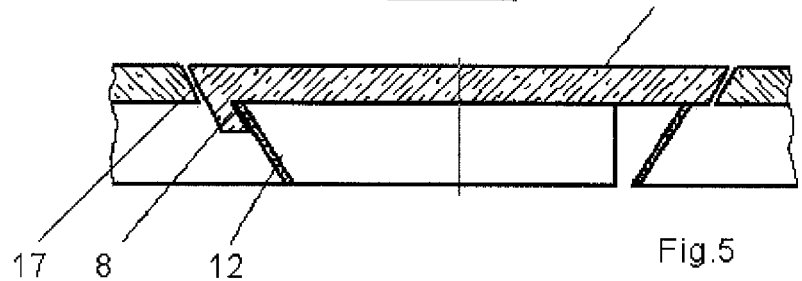
Fig. 6
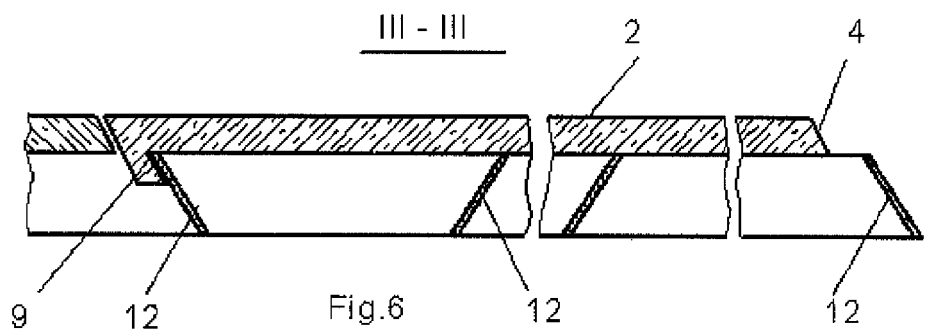
Fig. 7  Fig. 8  Fig. 9  Fig. 10  Fig. 11
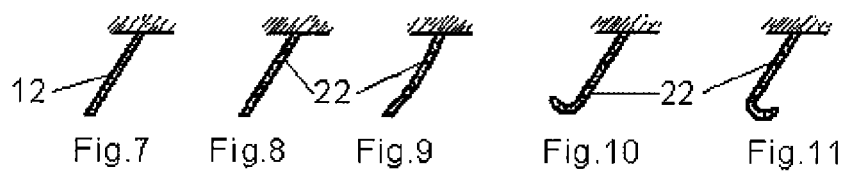
Fig. 12  Fig. 13  Fig. 14  Fig. 15
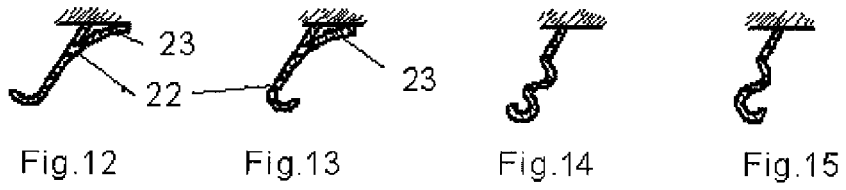

SUPPORT STRUCTURE FOR A SOFT GROUND

CROSS-REFERENCE TO RELATED APPLICATION

This application is a national stage application of and claims priority to and all the advantages of International Application No. PCT/RU2007/000312, filed on Jun. 9, 2007, under 35 U.S.C. §371, the entire disclosure of International Application No. PCT/RU2007/00312 is expressly incorporated herein by reference.

DESCRIPTION OF PRIOR ART

The present invention relates to the area of industrial and civil engineering and can be used in construction of roads, prefabricated demountable passages, airfields, foundations of various buildings and structures, technological platforms of various destination and waterfront structures, especially on soft grounds.

Russian Patent Number 2032790 issued on Apr. 10, 1995 (international classification E02B, 3/12; E01C, 5/06) discloses a support structure of a building, structure, prefabricated road or airfield coating, with an anchoring element, made trapeziform in cross section and located on the side of the bearing surface of the base of the structure and having arc-like segments, formed with respect to the horizontal plane with broken lines or curves of constant or sliding in the range of one segment curvature. The side surface of one of the segments of the anchoring element, located with respect to the longitudinal axis of the base, has an incline from the nearer ends of the base to the center or centers of the curvature of the curved line of the segment, the side surface of the other segment being inclined from the center or centers of its curvature or the curvature of the curved line of the segment to the nearer ends of the base. Besides, the base has two projections in the form of hooks, located on the side of the bearing surface of the base near side and end face respectively, the arc-like segments of the anchoring element being projected in their middle part outside the contour of the base, forming a nest for locating corresponding projections of other support structures.

Big material consumption, small holding power and stability, as well as big labor input in production and construction of such prefabricated structures make them inconvenient.

Russian Patent Number 2029815 issued on Feb. 27, 1995 (international classification E01C, 5/06, FIG. 1) discloses a support structure, comprising, at least, two plates, on the bearing surface of which anchoring projections and an anchoring element are located, the side surface of the latter being inclined in cross direction from the center of the plate base to its periphery and having closed arc-like segments, projected outside the contour of the plate base on the size not less than the width of the anchoring projection.

However, this construction though having good holding power, is insufficiently stable and effective under active loads as it insufficiently distributes loads onto adjacent plates, which leads to a diagonal inclination error (turn) of support structures.

The Russian Patent Number 2107768 issued on 27 Mar. 1998 (international classification E01C, 9/00, FIG. 1) discloses a technology similar to the present invention. The structure consists of at least two elements, each of the elements comprising a plate, on the lower bearing surface of which three anchoring projections in the form of hooks are made or secured, one of the projections being located near the end face, the other two—located at the side faces, and a curved anchoring element, the side faces of which are inclined with respect to the horizontal surface of the plate. The anchoring element contains three arc-like segments, projected outside the contour of the plate base on the size not less than the width of the anchoring projection and meant for their conjugation with anchoring projections of adjacent plates, forming one whole support construction.

Despite good holding power and stability on a soft and waterlogged ground, similarly to the previous one, this support structure is ineffective because it insufficiently distributes loads onto adjacent supporting plates, which leads to vertical and horizontal shifts, local spalls and potholes on faces and angles, uneven coating and results in plates wear-out, short service life and poor safety.

SUMMARY OF THE INVENTION

The engineering problem of the present invention is to increase holding capacity, safety and service life as well as to provide an even top surface of a support structure.

The engineering problem of the present support structure is solved thanks to its structure, comprising at least two elements, each of the elements containing a plate, on the lower bearing surface of which three anchoring projections in the form of hooks are made or secured, one of the projections being located near the end face, the other two—located at the side faces, and a curved anchoring element, having the side faces inclined with respect to the horizontal surface of the plate and three arc-like segments, projected outside the contour of the plate base on the size not less than the width of the anchoring projection and in addition to the forgoing features, each side face of the plate of the present structure consists of two parts inclined in the opposite directions with respect to the longitudinal section and end faces of the plate are inclined in the same direction.

Besides, the end face and adjacent with it parts of side faces in the area of anchoring projection-hooks together with outside faces of the latter are made inclined at a sharp angle to the top surface of the plate. Besides, on one of the side faces of the plate the length of its part inclined at a sharp angle to the top surface of the plate is made longer than a part of its face, inclined at an obtuse angle to the top surface of the plate, and on other side face of the plate, the length of its part, inclined at an obtuse angle to the top surface of the plate is made longer than the part of the face, inclined at an acute angle to the top surface of the plate.

Furthermore, on both side faces of the plate, in the area of conjugation of differently directed parts of one face, stops are formed, which improves conjunction and prevents adjacent plates from shear shifting in length and height.

The inner surfaces of anchoring projections near side faces are preferably made curved with respect to the longitudinal section of the plate, the inner surfaces near the end face are made curved with respect to the cross-section section of the plate.

In addition, the inner surfaces of the anchoring projection-hooks can be inclined to the lower surface of the plate at different angles, namely, the inner surface of the anchoring projection near the end face being inclined at a sharp angle, and at least one of the inner surfaces of the anchoring projections near side faces being inclined either at a right angle or at a sharp angle.

The structure of the anchoring element can be various, its cross section representing either a solid flat or curved strip, fixed at an angle to the plate, or a solid flat strip with a free lower end, curved inside or outside, or a zigzag solid strip with a free end, curved inside or outside.

The best results are achieved when all the variants of the structure of the anchoring element are made from punched strips.

The plate of the present structure can be made of ferroconcrete or another material, with high reliability and elastoviscousness, providing its secure semi-rigid or rigid conjunction with the anchoring element as well as rigid fixing of anchoring projection-hooks on it.

Projections in the form of hooks can be made o ferroconcrete or sheet, or other metals with high durability, reliability and elastoviscousness, providing their secure fixation to the lower surface of the plate of an element of a support structure.

The anchoring element can be made, for example, from a metal strip 3-6 mm thick or a sheet antibactericidal glass-fiber polymeric material 5-10 mm thick, or from another material possessing high reliability and elastic-viscous properties and providing its secure semirigid or rigid fixation on the lower surface of the plate of an element of a support structure.

Taking into consideration various conditions and technological possibilities, as well as economic sense, at manufacturing of a support structure, anchoring projection-hooks and/or an anchoring element can be made both as a single whole with a plate, and detachable with it. Anchoring projection-hooks are fixed rigidly, an anchoring an element can be fixed rigidly or semi-rigidly to a plate both in the course of product manufacturing and on a site.

The entity of the present invention will be illustrated by the following drawings when taken in conjunction with the accompanying description of the preferred embodiment, the latter not including all the modifications, additions and alterations that may be made to the invention.

LIST OF THE DRAWINGS

FIG. 3 is a cut I-I on FIG. 2;

FIG. 4 is a cut II-II on FIG. 2 with the inner surface of a projection-hook, perpendicular to the lower surface of the plate;

FIG. 5 is a cut on FIG. 2 with the inner surface of a projection-hook inclined at an acute angle to the lower surface of the plate;

FIG. 6 is a cut on FIG. 2;

FIG. 7 is a cross-section of a continuous anchoring element;

FIG. 8 is a cross-section of a punched anchoring element;

FIG. 9 is a cross-section of a punched anchoring element with curved configuration;

FIG. 10 is a cross-section of a punched anchoring element with a curved free lower end directed to an outer side;

FIG. 11 is the same, as FIG. 10, but with the curved free lower end directed inside;

FIG. 12 is the same as FIG. 10 where the anchoring element is supplied with an additional element of fixation in areas, except areas of three projected arc-like segments;

FIG. 13 is the same as FIG. 11 where the anchoring element is supplied with an additional element of fixation in areas except areas of three projected arc-like segments;

FIG. 14 is a cross-section of an anchoring element in a zigzag form with a curved free lower end directed to an outer side;

FIG. 15 is the same as FIG. 14, with a curved free lower end directed inside.

DESCRIPTION OF THE PREFERRED EMBODIMENT

Figure 1:
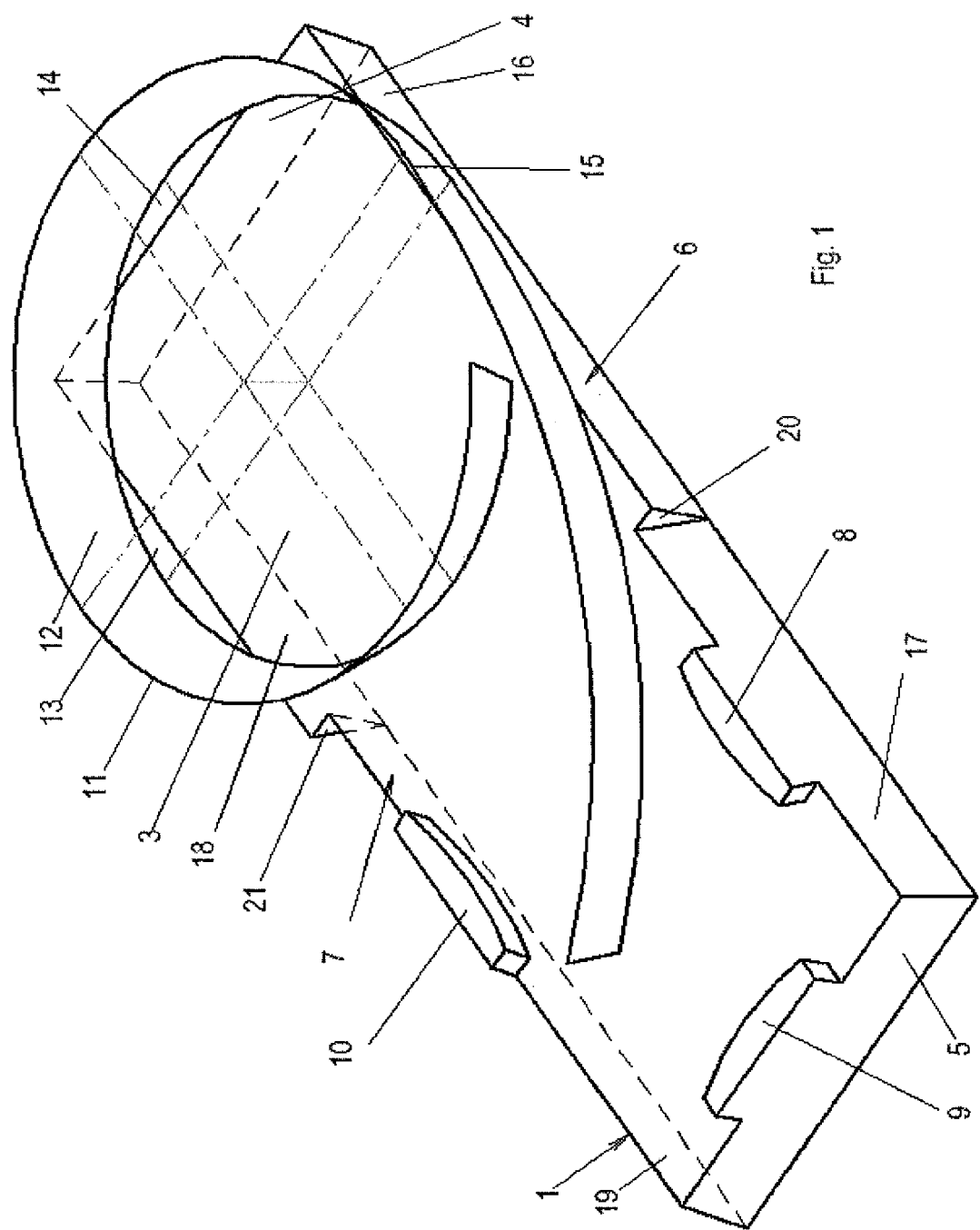
FIG. 1 is a general (bottom) view of an element of the support structure, consisting of a plate, an anchoring element and three anchoring projections in the form of hooks; in an isometry.
Figure 2:
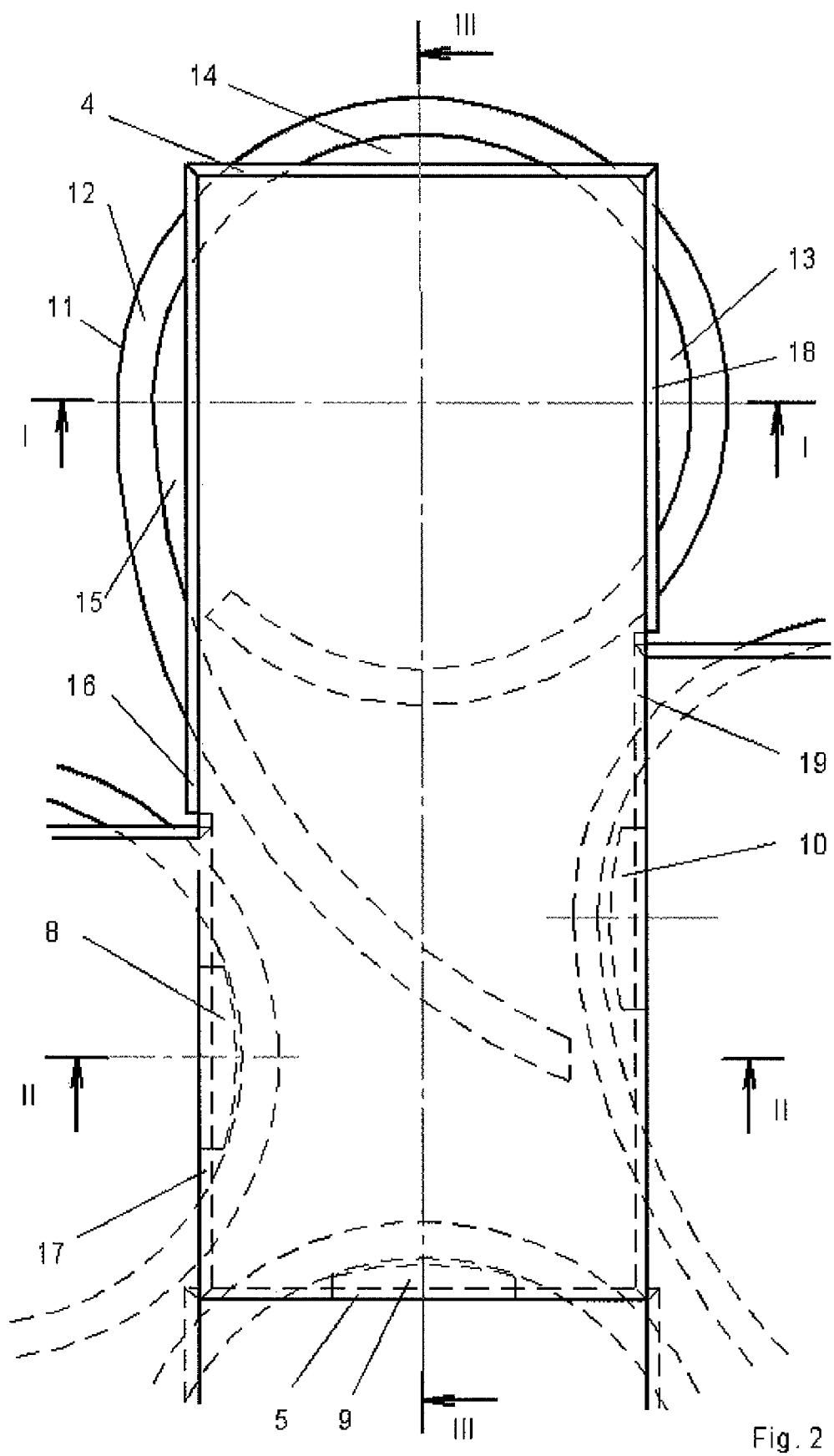
FIG. 2 is a plan view of an assembled support structure with several plates.

With reference to the drawings, each element of a support structure comprises a plate 1, having a top support surface 2, a bottom support surface 3, end faces 4 and 5, side faces 6 and 7. On the lower support surface 3 of the plate 1 anchoring projections in the form of hooks 8, 9, 10 and a curved anchoring element 11 are made or secured, the anchoring element having its side surfaces 12 inclined to the horizontal plane of the plate, and having three bow-shaped sites 13, 14, 15 projected outside the contour of the base of the plate 1 in front of one of end faces 4 and two side faces 6, 7 on the size not less than that of the width of the anchoring projection-hook.

Each of side faces of the plate consists of two parts inclined with respect to the longitudinal section of the plate 1 in the opposite directions. The side face 6 is made on the part of the length 16, inclined at an obtuse angle to the top surface 2 of the plate 1 and on the part of length 17, inclined at a sharp angle to the top support surface 2 of the plate 1. Further, the side face 7 is made on the part of the length 18, inclined at an obtuse angle to the top support surface 2 of the plate 1, and on the other part 19, inclined at a sharp angle to the top support surface 2 of the plate 1.

The plane of the part of the length 16 of the face 6 is equal in length and parallel to the plane 19 of the part of the length of the face 7, the plane 17 of the part of the length 6 is equal in length and parallel to the plane 18 of the part of the length of the face 7.

The end faces 4 and 5 are parallel to each other and inclined in the same direction with respect to the cross section of the plate, the end face 4 being made at an obtuse angle to the top surface 2 of the plate 1, the end face 5, in its turn, being made at a sharp angle to the top surface 2 of the plate 1.

The end face 5 and adjacent with it parts 17, 19 of the side faces 6 and 7, in the area of the anchoring projection-hooks, together with the outer faces of the latter, are inclined at a sharp angle to the top surface 2 of the plate 1.

The end face 4 and adjacent with it parts (16, 18) of the side faces 6 and 7, in the area of the anchoring element, are inclined at an obtuse angle to the top surface 2 of the plate 1.

On one side face 6 of the plate 1 the length of its part 16 is made longer than its part 17, on the other side face 7 the length of its part 19 is longer than its part 18.

At side faces 6 and 7 of the plate 1, in the area where the differently directed parts of one face are conjugated, stops 20 and 21 respectively are provided, which improves conjunction and prevents adjacent plates from shear shifting in length and height.

The anchoring element 11 is made punched with through-holes 22.

At the operation of the present structure on a soft ground, the form of the anchoring element 11 in the cross-section represents a strip with rectangular cross-section.

In order to increase holding capacity and stability of the structure, as well as to reduce edge stress from the anchoring element in the ground on bogs and over-damped grounds, as well as quick sands, more sophisticated forms of the anchoring element are appropriate to use. The cross-section of such forms is shown on FIGS. 8-15.

FIG. 9 depicts an anchoring element, having in its cross-section a smoothly curved line, which provides smoothing, reduces pressure and increases resistance to bending moment under heavy dynamic loads on the support structure.

FIGS. 10 and 11 shows a cross-section of an anchoring element of a support structure which enables to bring into action depth layers of ground, as well as to reduce pressure, occurring at edge parts in the lower part of the anchoring element.

FIGS. 12 and 13 illustrate a cross-section of the anchoring elements with the elements of fixation 23, which enable to increase resistance to bending moment in the areas of fixation of the anchoring element to the plate, providing for high holding capacity and stability in extreme operating conditions, for instance, under continuous heavy dynamic load or seismic exposure.

In order to secure higher stability of a support structure on soft ground, especially, in earthquake regions, to reduce frequency and amplitude of vibrations under dynamic and seismic loads, the anchoring elements, the cross-section of which is depicted in FIGS. 14 and 15, are made in the zigzag form.

Three anchoring projection-hooks and three arc-like segments, projected outside the contour of the base on each plate, provide for even steady fixation of the plate all along its perimeter. Owing to the stops 20 and 21 and the end faces and parts of the side faces being made inclined, smoothness, solidity and integrity of the whole support structure, preventing plates from shifting in longitudinal, cross-section and vertical directions, are provided.

It can thus be seen that the use of the novel characteristics together with the features of the over known support structure provides for even coating of a support structure, better load transmission between the elements of a support structure, eliminating spalls of faces and edges of plates under any dynamic loads and jolty vehicles.

In the embodiment of the present structure, as a result of heavy transport loads on the coating of the support structure, appears a temporary flexural bowl, in the area of the latter load transmission transfers to anchoring elements, then to firmer depth layers of the ground. The load transmission also transfers to plates and anchoring elements of the adjacent elements of the support structure, the latter, in their turn, distribute active load onto their adjacent elements of the support structure and through their own anchoring elements, distribute load to the depth layers of the ground, as well as the layers of the grounds, remote from the place of active load.

The present invention, therefore, allows soft ground to operate under heavy load, received by the support structure in elastic bending stage, without overpressure resulting in permanent deformations. This feature improves holding capacity, reliability and service life of the support structure.

INDUSTRIAL APPLICABILITY

The present invention can be applied in construction on common grounds but, mainly, on soft ground, namely, peats, seasonally over-damped soils, over-flown lands of rivers and lakes, loess soils, running ground, ever-frozen soils, quick sands and other grounds.

The present invention is used in construction of roads, prefabricated demountable passages, foundations and bases for various buildings and structures, including, earthwork structures and stabilization of their slopes. It can also be used in construction of airfield runways, helicopter decks, sites for construction machinery, load supporting points, receiving sites of waterfront structures.

The present invention can also be used in construction of dismountable roads for heavy machinery to reach the pipeline accident sites on marshland or in construction of prefabricated demountable passages on soft grounds, collapsible soils, for example, disposal dumps, as well as in building seaside and riverside docks, supports of power supply lines, radio towers, buildings and constructions in ground-level and above-ground pipeline laying.

The present invention provides for high stability of foundations, bases of different structures, roads and passages under dynamic, seismic and static loads.

The proposed support structure can be produced in industrial scale as standard equipment and materials are used in its production.

The invention claimed is:

1. A support structure for soft ground including at least first and second elements, each of the elements comprising:
   a plate (1) having first and second end faces (4, 5), first and second side faces (6, 7), a top surface (2) and a lower supporting surface (3) with three anchoring projections in the form of first, second and third hooks thereon, wherein the first hook (9) is positioned proximate the second end face (5), and
   a curved anchoring element (11) having side surfaces (12) inclined with respect to the lower supporting surface, wherein the curved anchoring element has three arcuate segments (13, 14, 15), that project beyond the lower supporting surface at the first end face and at the first and second side faces, providing a space sufficient to engage one of the hooks,
   wherein each of the side faces (6, 7) comprises first and second portions inclined in opposite directions with respect to a longitudinal section of the plate (1), wherein the end faces (4, 5) are inclined with respect to a transverse section of the plate (1) in the same direction, wherein the second and third hooks (8, 10) are positioned proximate the first portions of the side faces,
   and wherein the second end face (5), the first portions (17, 19) of the side faces (6, 7) adjacent to the second end face, and outside faces of the hooks are inclined at an acute angle with respect to the top surface (2),
   and wherein the first end face (4) and the second portions (16, 18) of the side faces (6, 7) adjacent to the first end face are inclined at an obtuse angle with respect to the top surface (2);
   and wherein the first portions of the first and second side faces (6, 7) are of unequal length, and wherein the second portions of the first and second side faces are of unequal length, wherein for each of the side faces, the first and second portions are separated by a limit surface (20, 21) that is positioned to inhibit longitudinal movement of the first and second elements thereby.

2. The support structure as claimed in claim 1, wherein the anchoring element is a punched (22) member.

3. The support structure as claimed in claim 1, wherein inner surfaces of the second and third hooks (8, 10) are arcuate with respect to the longitudinal section of the plate (1), and an inner surface of the first hook (9) is arcuate with respect to a transverse section of the plate (1).

4. The support structure as claimed in claim 3, wherein the inner surface of the projection-hook (9) near the end face (5) is inclined at an acute angle with respect to the lower supporting surface (3).

5. The support structure as claimed in claim 3, wherein the inner surface of at least one of the second and third hooks (8, 10) is perpendicular to the lower supporting surface (3).

6. The support structure as claimed in claim 3, wherein the inner surface of at least one of the second and third hooks (8, 10) is inclined at an acute angle with respect to the lower supporting surface (3).

* * * * *